US012103658B2

(12) United States Patent
Bian et al.

(10) Patent No.: US 12,103,658 B2
(45) Date of Patent: Oct. 1, 2024

(54) SEA WATER INTAKE RISER SYSTEM

(71) Applicant: SINGLE BUOY MOORINGS INC., Marly (CH)

(72) Inventors: Xiaoqiang Bian, Bât. Aigue Marine (MC); Peimin Cao, Bât. Aigue Marine (MC); Chen Xiang, Bât. Aigue Marine (MC); Qing Li, Bât. Aigue Marine (MC)

(73) Assignee: SINGLE BUOY MOORINGS INC., Marly (CH)

( * ) Notice: Subject to any disclaimer, the term of this patent is extended or adjusted under 35 U.S.C. 154(b) by 249 days.

(21) Appl. No.: 17/437,891

(22) PCT Filed: Mar. 12, 2020

(86) PCT No.: PCT/EP2020/056636
§ 371 (c)(1),
(2) Date: Sep. 10, 2021

(87) PCT Pub. No.: WO2020/182940
PCT Pub. Date: Sep. 17, 2020

(65) Prior Publication Data
US 2022/0144404 A1 May 12, 2022

(30) Foreign Application Priority Data

Mar. 12, 2019 (EP) .................................. 19162215

(51) Int. Cl.
*B63J 2/12* (2006.01)
*B63B 39/03* (2006.01)
(Continued)

(52) U.S. Cl.
CPC .................. *B63J 2/12* (2013.01); *B63B 39/03* (2013.01); *B63B 75/00* (2020.01); *B63B 2035/442* (2013.01); *B63J 2002/005* (2013.01)

(58) Field of Classification Search
CPC .... B63J 2/00; B63J 2/12; B63B 75/00; B63B 2035/442; B63B 2002/005; B63B 22/00; B63B 22/02; B63B 39/00; B63B 39/03
(Continued)

(56) References Cited

U.S. PATENT DOCUMENTS

| 4,231,312 A * | 11/1980 | Person | F03G 7/05 |
| | | | 114/264 |
| 8,297,213 B2 * | 10/2012 | Liberg | B63B 13/00 |
| | | | 114/125 |

(Continued)

FOREIGN PATENT DOCUMENTS

| KR | 2011-0061876 | 6/2011 |
| WO | 2016/0144158 | 9/2016 |

OTHER PUBLICATIONS

International Search Report for PCT/EP2020/056636 mailed Apr. 21, 2020, 4 pages.
(Continued)

*Primary Examiner* — Lars A Olson
(74) *Attorney, Agent, or Firm* — NIXON & VANDERHYE

(57) ABSTRACT

A sea water intake riser system for a floating production unit, including a caisson having a through-opening in a bottom side and being connectable to an upper end of a riser pipe; a lift pump inside the caisson and having an inlet at a vertical distance with a predetermined minimum submergence for pumping cold water from the caisson up to the floating production unit for use as cooling medium, wherein the sea water intake riser system includes at least two caissons, having a height substantially equal to a vertical height of a hull of the floating production unit and including an open top side; each caisson extending from a predetermined minimum distance from the bottom side of the hull up to at least
(Continued)

the water-line during use and wherein a sump tank is located between the bottom side of the hull and the at least two caissons.

14 Claims, 3 Drawing Sheets

(51) Int. Cl.
  *B63B 75/00* (2020.01)
  *B63B 35/44* (2006.01)
  *B63J 2/00* (2006.01)
(58) Field of Classification Search
  USPC .......................................................... 114/125
  See application file for complete search history.

(56) References Cited

U.S. PATENT DOCUMENTS

| | | | |
|---|---|---|---|
| 10,189,553 B2* | 1/2019 | Portier | B63J 2/12 |
| 10,967,949 B2* | 4/2021 | Odorico | B63J 2/12 |
| 2010/0180810 A1 | 7/2010 | Liberg | |
| 2018/0127079 A1 | 5/2018 | Odorico et al. | |

OTHER PUBLICATIONS

Written Opinion of the ISA for PCT/EP2020/056636 mailed Apr. 21, 2020, 5 pages.

* cited by examiner

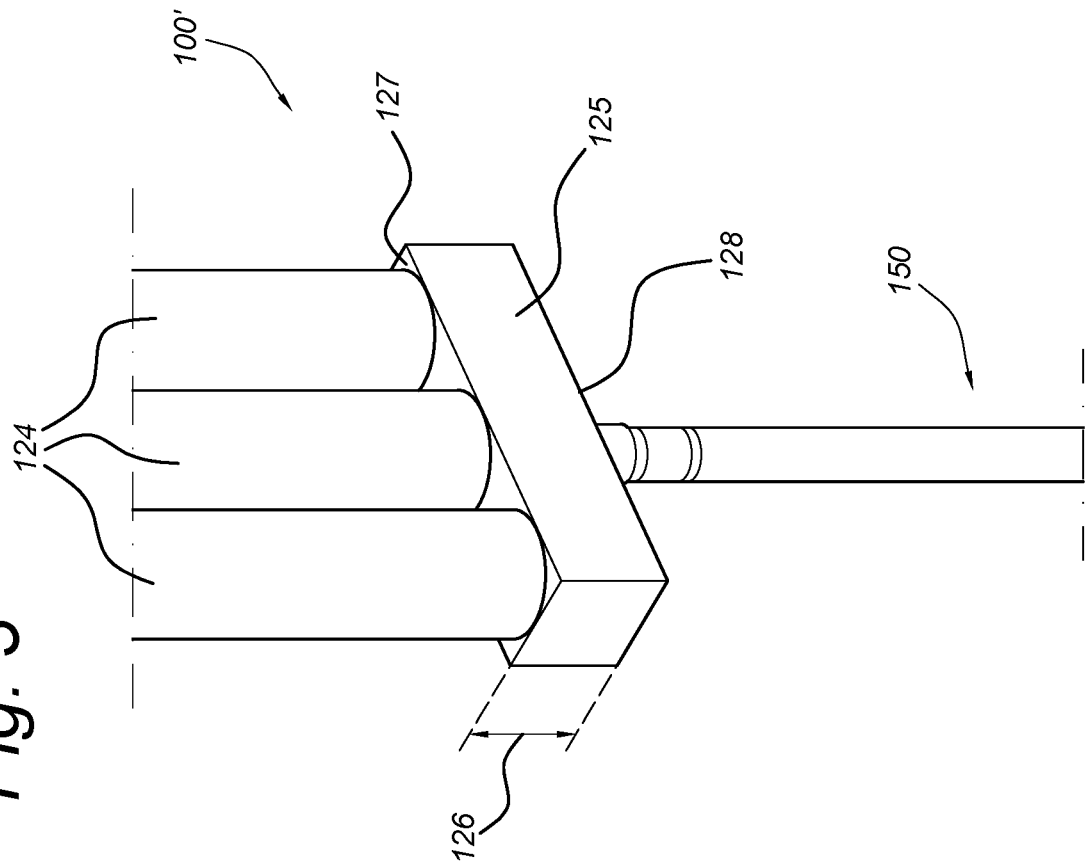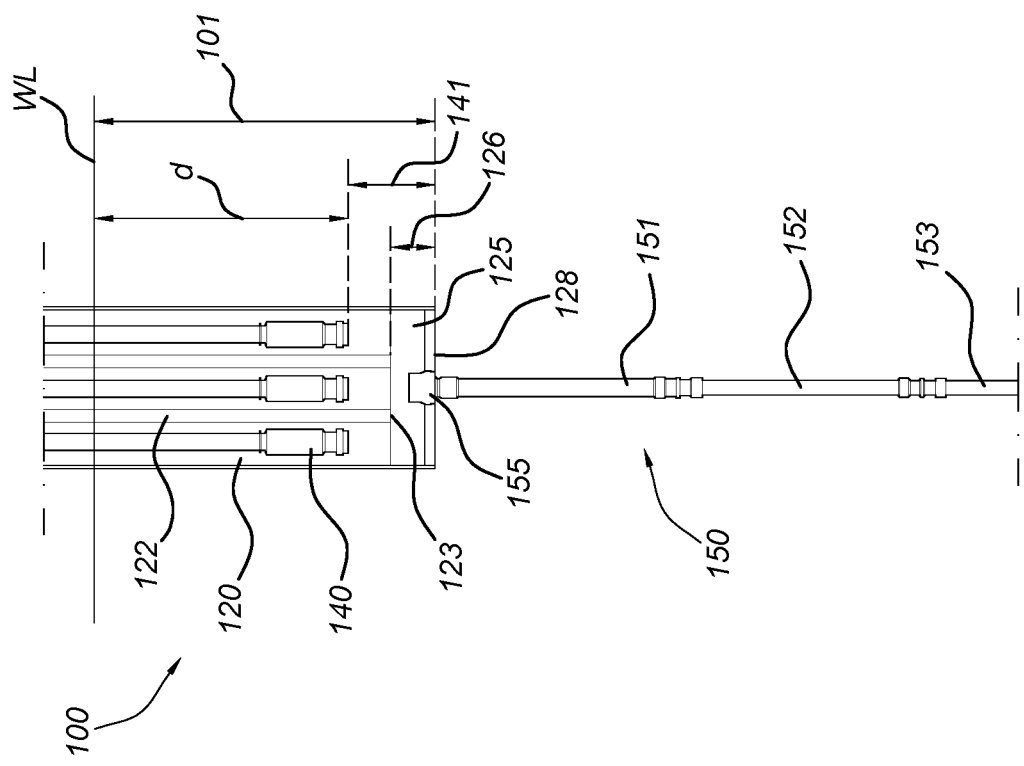

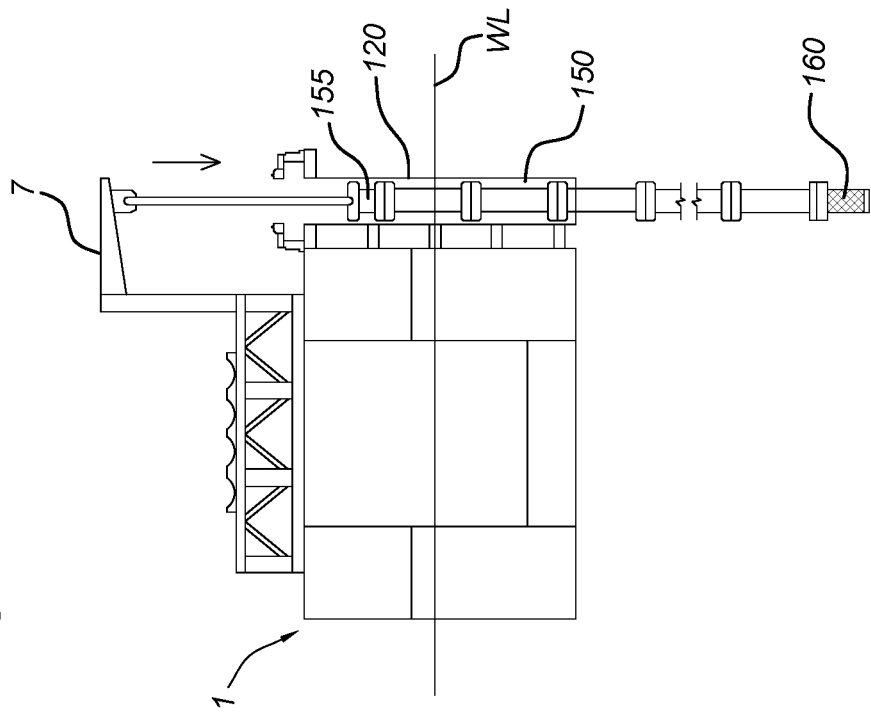
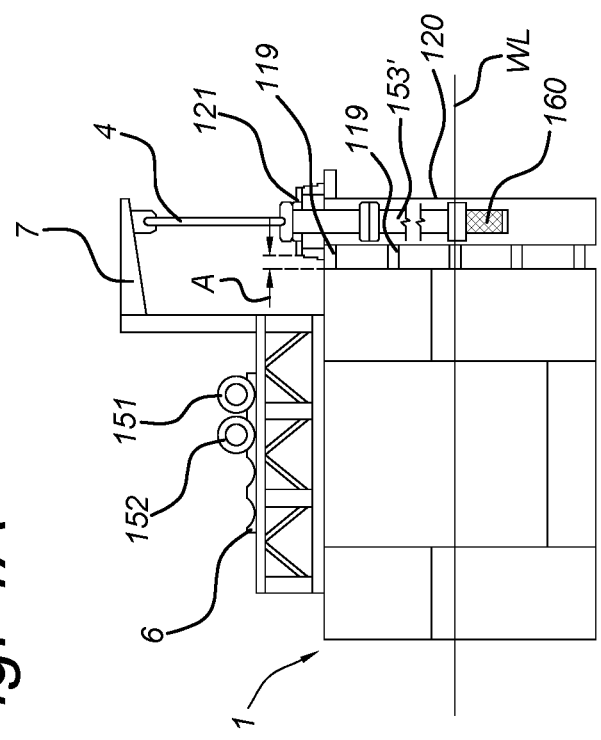

SEA WATER INTAKE RISER SYSTEM

CROSS-REFERENCE TO RELATED APPLICATIONS

This application is the U.S. national phase of International Application No. PCT/EP2020/056636 filed Mar. 12, 2020 which designated the U.S. and claims priority to EP Patent Application No. 19162215.8 filed Mar. 12, 2019, the entire contents of each of which are hereby incorporated by reference.

BACKGROUND OF THE INVENTION

Field of the Invention

The present invention relates to a sea water intake riser system for a floating production unit, comprising a caisson having a through-opening in a bottom side and being connectable to an upper end of a riser pipe; a lift pump arranged inside the caisson and having an inlet at a vertical distance with a predetermined minimum submergence and adapted for pumping cold water from the caisson up to the floating production unit for use as cooling medium by production equipment of the floating production unit. The present invention also relates to a floating production unit comprising a sea water intake riser system. Further, the present invention relates to a method of manufacturing such a sea water intake riser system.

Description of the Related Art

Known submerged sea water intake riser (SWIR) systems are typically installed in a caisson outboard one side of the hull of a floating production unit, while the other side of the hull is allocated for mooring fairleads. The SWIR systems include a steel and/or flexible riser having an inlet at the lower end which is extended up to about 100 m below the caisson for taking in naturally colder water at that water-depth. During normal pumping operation, the water level in the caisson is lower than the outside water surface, generating a pressure difference for the lower temperature water at the inlet at the bottom of the riser piper to flow into the caisson, from where this cold water is pumped to the process facilities of the floating production unit to act as cooling liquid. A direct link exists between the topside process efficiency, for example for producing power, and the cooling capacity provided by the SWIR system. Thus providing colder water to the process facilities allows production being increased and/or smaller cooling facilities being used. Colder water can be used from larger depths by using longer sea water intake risers, as it is commonly known that sea water temperature decreases around 1.5° (Celsius scale) per 100 m water-depth. However, as can be worked out using the one-dimensional unsteady Bernoulli's equation, under the vertical and axial accelerations, the lift pumps will experience large and frequent pressure variations, e.g. vacuum and high pressure hammering, which may compromise the cooling operation and/or damage the equipment. The longer the pipe, the more pressure variations it will generate.

The present invention seeks to provide a SWIR system with improved cooling efficiency at unsteady sea-conditions.

SUMMARY OF THE INVENTION

According to the present invention, a sea water intake riser system for a floating production unit, comprising at least two caissons, wherein the height of each caisson is substantially equal to a vertical height of a hull of the floating production unit and extends, when mounted to the hull of the floating production unit, from a predetermined minimum distance from the bottom side of the hull up to at least the water-line during use, each caisson comprising an open top side and a through-opening in a bottom side; a lift pump arranged inside each of the caissons and having an inlet at a vertical distance with a predetermined minimum submergence and adapted for pumping cold water from the caisson up to the floating production unit for use as cooling medium by production equipment of the floating production unit, and a sump tank, attached to the bottom side of each of the caissons such that each through-opening thereof is in fluid communication with a volume inside the sump tank, the sump tank being located between the bottom side of the hull and the at least two caissons when mounted and having a through-opening in a bottom side and being connectable to an upper end of a riser pipe.

During use, the lift pumps are located with their inlets at a predetermined distance below the waterline. During normal pumping operation, the water level in the caisson is lower than the outside water surface, generating a pressure difference for water to flow into the caisson from the riser pipe through the sump tank, where water is pumped to the topside facilities on deck using the lift pumps. The sump tank positioned between the caissons and the bottom side of the hull holds a constant body of water, which acts as a buffer volume between the water inflow at the bottom side and the water outflow at the lift pumps. Under FPU periodical heave motions, water pressure inside the riser will naturally move up and down, which would cause the water level inside the caissons to rise and fall if directly connected to the riser. Within the fixed volume of the sump tank, no such movement is possible, resulting in a more stabilised pressure at the through-opening at the bottom side of the caisson, limiting the water level movement inside the caissons. Further, due to multiple caissons being connected to the top side of the sump tank, the caissons have a width equal to maximum the width of the sump tank divided by the amount of caissons connected thereto, which reduced width effectively reduces the distance over which the water may move, creating an individual water column around each respective lift pump and reducing variations in water level around each lift pump. The pump submergence and riser diameter are determined based on a required design flow rate and to prevent the lift pumps running dry and suffering from subsequent pressure loss. Due to the reduction in water level variation around each lift pump, the pressure variation at the predetermined minimum distance from the bottom side of the caisson is reduced. The constant body of water present in the sump tank, between the predetermined minimum distance from the bottom side of the caisson and the through-opening in the bottom side subsequently levels out any pressure differences between the individual columns of water. Thus due to the constant volume of water being present in the sump tank and the use of individual caissons around the lift pumps, the pressure variations at both the through-opening of the sump tank and around the inlets of the lift pumps are reduced significantly, resulting in the SWIR system having a more constant operating efficiency, substantially independent from sea conditions and riser pipe sizing.

Generally, riser pipes have a relatively large diameter of at least 0.75 m, but preferably at least 1 m, to allow sufficient water intake using only a single SWIR system. A distance between the inlet of each of the lift pumps and the water-line is preferably at least 10 meters, which is governed and predetermined by a hydraulic study of SWIR system with sump tank.

Further, due to the substantially equal height of the caisson to the vertical height of the hull and having the bottom side substantially near to the bottom side of the hull, the open top side of the caisson is at substantially the same height as the deck. As a result, easy access can be obtained to the inside of the caisson, making it easier to (dis)connect the riser pipe to the caisson and provide maintenance and repair, even while offshore.

According to an embodiment, the caisson and sump tank are provided with mounting elements for mounting the caisson and sump tank externally to and at a predetermined distance from the hull, the sump tank having a bottom side substantially near the bottom side of the hull.

The bottom side being at or near the bottom side of the hull allows that the sump tank may have a lower surface parallel to the bottom of the hull. Mounting the SWIR system a distance from the hull allows the system being hung off outboard of the FPU column without penetrating into FPU hull. This results in easier manufacturing of the SWIR system as the caisson can be produced separately from FPU and even retrofitted to existing vessels.

According to a further embodiment, a riser pipe is removably mounted into the through-opening of the caisson with an upper end, the riser pipe having a free opposite lower end, which is provided with a strainer water-inlet, the riser pipe being adapted for transporting water from the water-inlet into the caisson.

According to another embodiment, the riser pipe is at least 300 m long.

By using a longer riser, colder water at greater depth is reached and transported by the riser into the caisson for use as cooling water. Below the surface layer of the ocean, the water temperature drops with around 1.5° per 100 m until a temperature of around 4° C. is reached.

The availability of cooler cooling water results in less cooling water being required to reach the same amount of cooling at the topside production facilities. With a lower cooling water amount requirement, a reduction of topside key equipment, such as gas turbine/cooling medium/lift pumps, etc. is possible, resulting in topside weight savings and equipment footprint reduction, which in turn may reduce carbon emission for the FPU.

According to an embodiment, the sea water intake riser pipe is a substantially flexible riser pipe, being provided with a ballast at the lower end.

The flexibility of the pipe allows the pipe to move with the motions of the sea without transferring large loads to the caisson. Through the ballast at the lower end, the pipe is maintained substantially vertical, preventing overstress from bending, as well as keeping the inlet of the riser pipe at the predetermined water depth, ensuring the water transferred by the riser into the caisson is approximately at the design temperature for the cooling system of the platform facilities.

According to a further embodiment, the sea water intake riser pipe comprises at least one reinforced pipe which is with a first end fitted into the through-opening of the caisson, and a string of main body standard pipes which is with a first end connected to a second end of the reinforced pipe, which length of the string is configured to have a large self-support length.

A large self-support length should be understood as a pipe having a nearly neutrally buoyant weight when submerged in water. Thus the string of main body standard pipes adds a relatively low additional weight force component to the sea water intake riser pipe, allowing the string of main body standard pipes to be substantial without requiring any significant additional structural strength from the caisson and the connection thereto. The string of main body standard pipes connected to the second pipe has a length which is equal to the entire riser pipe length minus the length of the first and second pipes. Regular pipes have a length of approximately 12 m.

The reinforced pipe is of higher strength and rigidity than the string of main body standard pipes, enabling the reinforced pipe to transfer loads from the string of main body standard pipes and ballast weight at the water inlet thereof into the sump tank, as well as minimizes any large bending moments being transferred from the FPU to the SWIR string of main body standard pipes.

According to another embodiment, the string of main body standard pipes comprises a material with a high specific strength belonging to a group of polymers.

The group of polymers comprises polypropylene and polyethylene. The pipe preferably comprises HDPE, which results in a substantially buoyant string of main body standard pipes when filled with water, allowing the HDPE pipe being manufactured as a single pipe length.

The string of main body standard pipes may be manufactured as a single length, attached to the second pipe via a suitable coupling, or made up of pipe sections having a length substantially equal to regular pipe lengths.

If the string of main body standard pipes is manufactured as a single string of main body standard pipes, the string of main body standard pipes may be manufactured on-shore and transported to the FPU located field by "drag boat". For installation in the SWIR system, the string of main body standard pipes is then up-ended with a ballast weight. The up-ended single string of main body standard pipes is pulled in and locked into the bottom of sump tank with a riser seat and head. The installation process involves the installation vessel.

Alternatively, the HDPE SWIR pipe may be self-installed from production unit through caisson without the involvement of the installation vessel. The HDPE pipes are light weight which allows handling of the HDPE pipes with a minimum of heavy equipment, considerably reducing the offshore installation cost and schedule risk. During self-installation, the HDP pipes are manufactured into standard pipes and taken on-board on the topside in a laydown area. Each of the standard pipes is up-lifted by a crane or other lifting tool from the laydown area on the production deck, positioned at the top opening of the caisson, lowered down and hung-off on a dedicated work platform for assembly with a next one of the standard pipes. Each next standard pipe segment is lifted and assembled with the previous pipe and subsequently lowered down into and through the caisson and sump tank until the desired length is achieved. Finally the at least one reinforced pipe is attached, followed by a riser seat, with which the SWIR pipe is locked at the bottom of the sump tank.

If the riser pipe needs to be disconnected, the pipe can easily be lifted from the plate forming the bottom side of the caisson for access, removed from the top of the riser pipe and the riser pipe being lowered through the through-opening in the bottom side for removal.

Additionally, the present invention relates to a floating production unit comprising a sea water intake riser system as defined above, and a method for manufacturing a sea water intake system for a floating production unit as defined above.

Advantageous embodiments are further defined by the dependent claims.

BRIEF DESCRIPTION OF THE DRAWINGS

The present invention will be discussed in more detail below, with reference to the attached drawings, in which

FIG. 2 shows a sectional view of a cross-section of a SWIR according to an embodiment of the invention;

FIG. 3 shows an external sectional view of a SWIR according to an embodiment of the invention;

FIGS. 4A and 4B show two stages of offshore installation of the SWIR according to an embodiment of the invention.

DESCRIPTION OF THE PREFERRED EMBODIMENTS

Figure 1:
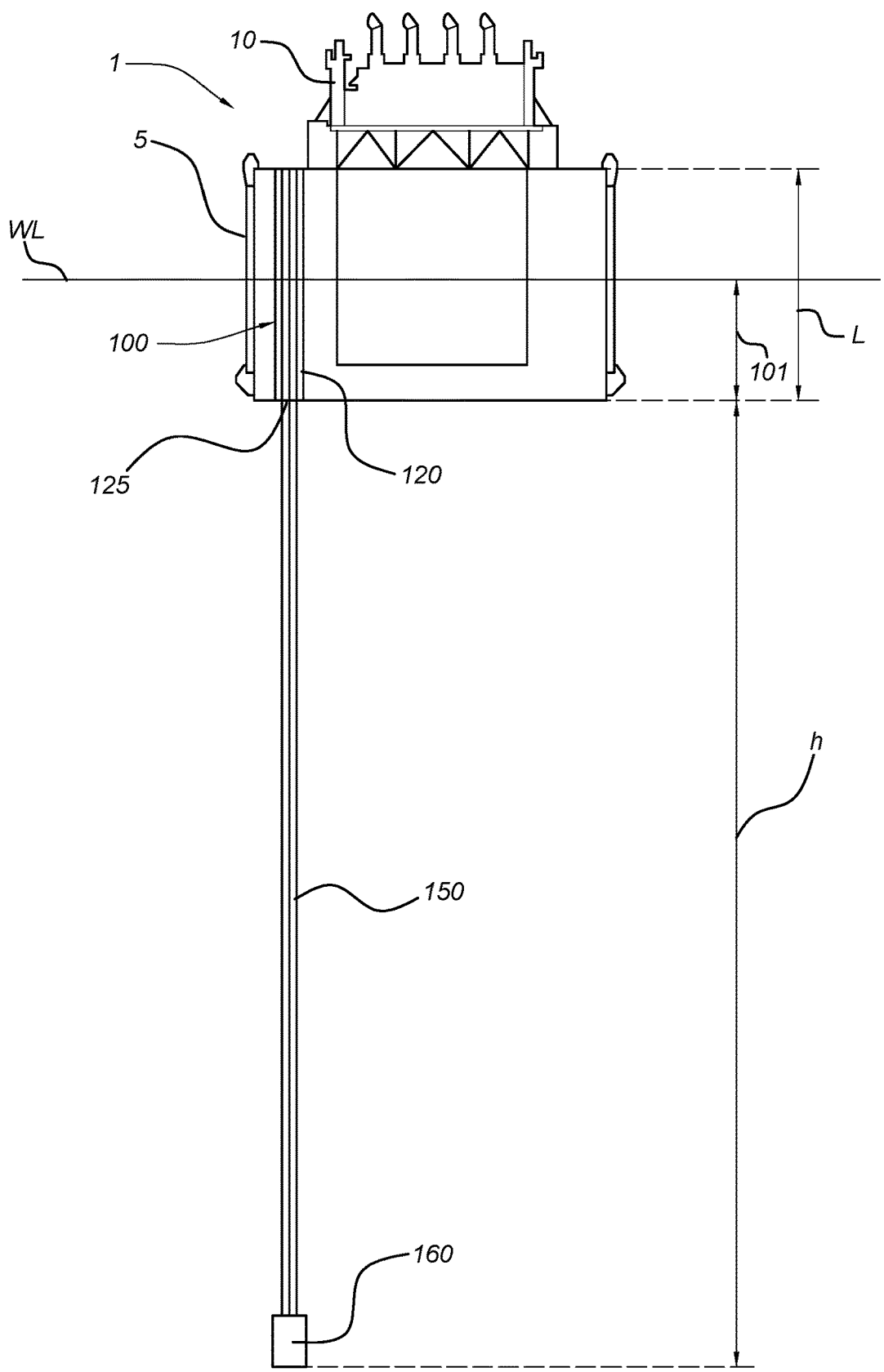
FIG. 1 shows a floating production unit with a SWIR system according to an embodiment of the invention.

FIG. 1 shows a floating production unit 1 with a SWIR system 100 according to an embodiment of the invention. The depicted floating production unit (FPU) 1 is a semi-submersible production unit with at least two, in an embodiment four, floating, submersible columns 5 forming the hull of the vessel, which are spaced apart from one another and supporting thereon a deck with production facilities 10. The columns 5 each have a total height L, extending between a bottom side of the column and the deck. When moored at a production location, the columns are partially submerged for providing the production unit with a predetermined stability, causing the columns to have a submerged draught 101 extending between the bottom side of the column and the water-line WL.

The SWIR system 100 comprises a caisson 120, a sump tank 125 and a sea water intake riser 150 with a strainer water-inlet 160. The caisson 120 is a longitudinal structure which is mounted with the longitudinal length in the vertical direction to one of the columns 5 of the FPU 1 and with a bottom side connected to sump tank 125 located at the bottom side of the column 5.

The sump tank 125 is a water volume tank with a top being connected to the bottom of caisson 120 and extending to the bottom side of the column 100 and connecting an upper end of the sea water intake riser 150 to a through-opening at the bottom of sump tank 125.

The sea water intake riser 150 is connected with an upper end to a through-opening in a bottom side of the sump tank 125. At the opposing, lower end of the sea water intake riser 150 a strainer water-inlet 160 is attached which is arranged to enable the sea water intake riser 150 transporting filtered water, thus water without for example debris and sea animals, up into the caisson. The sea water intake riser has a length h such that the strainer water-inlet 160 is at about 300 m or more below the water-level WL. The caisson 120, the sump tank 125 and the sea water intake riser 150 is discussed in more detail in reference to FIG. 2.

FIG. 2 shows a sectional view of a cross-section of a SWIR 100 according to an exemplary embodiment of the invention. The SWIR 100 is shown to comprise three caissons 120 parallel to each other, further comprising the sump tank 125 with the bottom side 128, three lift pumps 140 (one lift pump in each caisson), and the sea water intake riser 150, which comprises a first reinforced pipe 151, a second reinforced pipe 152 and a string of main body standard pipes 153 and which is with an outlet 155 connected to the sump tank 125 through an opening in the bottom side 128 thereof and a strainer water inlet 160 connected with the bottom of the string of main body standard pipes 153.

In an alternative embodiment, the SWIR 100 may comprise a different number of caissons, i.e., at least two caissons.

Each caisson 120 has a through-opening in a bottom side 123 and an open top (not shown). In an embodiment, the caisson has the shape of a large diameter pipe. Inside each caisson 120, a lift pump 140 is arranged having an inlet at a vertical distance 141 from the bottom side 128 of the sump tank. This vertical distance 141 between the inlet of the lift pump 140 and the bottom side 128 is smaller than a vertical distance 101 between the bottom side 128 and the water-line WL during use of the SWIR system. Preferably, a distance between the waterline WL and the inlet of each lift pump 140 is at least 10 m, ensuring the inlets of the lift pumps 140 remain submerged as much as possible throughout various sea motions. Each lift pump 140 is with an outlet connected to a conduit which extends between the lift pump 140 and the process facilities on deck (not shown here) and adapted for pumping water from inside the caisson 120 up to the floating production unit for use as cooling medium by production equipment of the FPU or cooling equipment of the FPU.

The caissons are arranged adjacent to each other extending from a predetermined minimum distance 126 from the bottom side of the hull upwards, but at least up to the water-line WL during use of the caisson. Each caisson 120 is arranged with an individual tank space around the associated lift pump, having a relatively narrow width, preventing a possible large displacement of water within the caisson to a single side due to vessel motions which could otherwise result in the lift pump 140 running dry.

At the lower end of the caisson 120, extending between the bottom side of the hull and the end of the caisson 123 at the predetermined minimum distance 126 therefrom, a space exists over the entire width of the three parallel caissons 120 which defines a sump volume or sump tank 125. The sump tank 125 acts as a buffer tank between the through-opening of the caisson and the partitioned volumes around the lift pumps 140.

The sea water intake riser 150 is removably attached to the caissons 120 at the through-opening in the bottom side of the sump tank 125, such that the through-opening of the sea water intake riser 150 is in open connection with the inside of the sump tank 125. The sea water intake riser pipe 150 is arranged as a substantially flexible riser and vertically hung-off from column 100 with a length of at least 100 meter, preferably at least 300 meter, into deep water, allowing the sea water intake riser pipe 150 to move with the FPU motions under the sea environment to some extent. The top of the sea water intake riser 150 comprises one or two reinforced pipes with the first pipe section 151 and second pipe section 152. The first pipe (section) 151 is fitted into the through-opening of the bottom side 128 of the sump tank 125 by means of a riser seat and head, ensuring water can only enter the caisson via the sea water intake riser. The two reinforced pipes 151 and 152 have a sufficient axial strength to carry the entire sea water intake riser system weight and the additional dynamic loads due to FPU motions under the sea environment. The reinforced pipes are either flexible hose type or stress joint type to minimize the large bending moment being transferred between FPU and the string of main body standard pipes 153.

The string of main body standard pipes 153 is made up from High Density Polyethylene (HDPE) standard pipe, having a length to reach down a significant depth from the caisson, preferably up to at least 300 meters down into deep sea water, and which string of main body standard pipes 153 is with a first end connected to a second end of the second pipe 152. The sea water intake riser pipe 150 is provided with a ballast in or near the strainer water-inlet 160 shown in FIG. 1. The HDPE string of main body standard pipes 153 is sized and configured based on a production topside facility 10 optimization design dictating a water depth from which the (cold) seawater is taken in by the SWIR system, involving a hydraulic study of the piping system and a global dynamic behaviour of the SWIR system.

The caisson 120 can be a large rectangular tank with internal partition walls comprising of metal plates which are welded together, forming individual caissons therein. FIG. 3 shows schematically an external sectional view of a SWIR 100' according to an embodiment of the invention. The caisson is shown to comprise three vertical pipes 124, each attached to the section making up the sump tank 125. The sump tank 125 has a height 126 from the bottom side 128 which corresponds to the height of the sump tank shown in FIG. 2. and is provided with a closing plate 127 at the upper side, with three through-holes corresponding to a diameter of the vertical pipes 124. The vertical pipes 124 are each with a lower end fixedly attached to the closing plate 127, each vertical pipe housing one of the three lift pumps depicted in FIG. 2. The lower ends of the vertical pipes 124 correspond with the lower end 123 shown in FIG. 2 and the walls of the vertical pipes 124 effectively make up the partition walls 122 as shown in FIG. 2. In this configuration, the partition walls are externally accessible, resulting in an easier to manufacture design.

The removable attachment of the riser seat and head allows the sea water intake riser pipe being installed and removed offshore in a relatively simple procedure, which may be performed using on-board lifting equipment of the FPU. FIGS. 4A and 4B show two stages of offshore installation of the SWIR according to an embodiment of the invention. In both figures the FPU 1 is shown, the FPU further comprising a crane 7 and a storage rack 6 on the deck. The caisson 120 is pre-manufactured and installed on-shore and attached to one of the columns 5, which caisson is provided with mounting elements 119 which mount the caisson externally to the hull at a predetermined distance A therefrom. At the open top side of the caisson 120 a hang-off tool 121 with a dedicated work platform is provided.

FIG. 4A shows the assembly of the sea water intake riser pipe, wherein the pipe is build up at the top of the caisson 120, making use of the hang-off tool 121 and dedicated work platform, and the pipe grows towards the bottom side of the caisson, eventually extending through the through-opening at the bottom side. First, second and further pipe sections 151, 152 are provided with a flange connection. In a first step, a lifting chain/wire 4 of the crane 7 is attached to a respective flange connection and a pipe section is lifted from the storage rack 6 into the open side of the caisson 120 until the flange is supported by the hang-off tool 121. The lifting wire 4 is then detached from the flange connection, returning to the storage rack 6 for lifting a subsequent pipe section from the wire rack 6 to a position directly above the pipe in the hang-off tool 121, such that a second pipe end of the subsequent pipe can be attached to the flanged first end thereof. After connecting the pipe sections into a pipe string, the string is removed from the hang-off tool 121 and lowered into the caisson 120 until the flange of the upper pipe is resting in the hang-off tool 121. These steps are repeated until the desired string-length for the string of main body standard pipes is achieved. Then the head is attached to the top end of the string and the string is lowered through the through-opening in the bottom side of the caisson, as shown in FIG. 4B, until the head is rested in the seat.

Alternatively to building up the entire length of sea water intake riser piping offshore, the HDPE string of main body standard pipes may be manufactured as a single length pipe onshore and transported to the FPU's offshore location. The first end of the HDPE string of main body standard pipes is then pulled through the through-hole in the bottom side of the caisson 120 into the hang-off tool 121 using the on-board crane 7 for fitting the first and second pipes and the head thereto in a manner similarly to described for FIG. 4A.

The present invention has been described above with reference to a number of exemplary embodiments as shown in the drawings. Modifications and alternative implementations of some parts or elements are possible, and are included in the scope of protection as defined by the appended claims.

The invention claimed is:

1. A floating production unit comprising a sea water intake riser system, the sea water intake riser system comprising:
   at least two caissons, wherein the height of each caisson is substantially equal to a vertical height of a hull of the floating production unit and extends, when mounted to the hull of the floating production unit, from a predetermined minimum distance from the bottom side of the hull up to at least the water-line during use, each caisson comprising an open top side and a through-opening in a bottom side;
   a lift pump arranged inside each of the caissons and having an inlet at a vertical distance with a predetermined minimum submergence and adapted for pumping cold water from the caisson up to the floating production unit suitable for use as cooling medium by production equipment of the floating production unit; and
   a sump tank, attached to the bottom side of each of the caissons such that each through-opening thereof is in fluid communication with a volume inside the sump tank, the sump tank being located between the bottom side of the hull and the at least two caissons when mounted and having a through-opening in a bottom side and being connectable to an upper end of a riser pipe, the sump tank being configured to hold a constant body of water;
   and wherein the caissons have a width equal to the width of the sump tank divided by the at least two caissons connected thereto.

2. The floating production unit according to claim 1, wherein the caisson and sump tank are provided with mounting elements for mounting the caissons and sump tank externally to and at a predetermined distance from the hull, the sump tank having a bottom side substantially near the bottom side of the hull.

3. The floating production unit according to claim 1, wherein a riser pipe is removably mounted into the through-opening of the sump tank with an upper end, the riser pipe having a free opposite lower end, which is provided with a strainer water-inlet, the riser pipe being adapted for transporting water from the water-inlet into the sump tank.

4. The floating production unit according to claim 1, wherein the riser pipe is at least 300 m long.

5. The floating production unit according to claim 1, wherein the sea water intake riser pipe is a substantially flexible riser pipe, being provided with a ballast at the lower end.

6. The floating production unit according to claim 5, wherein the sea water intake riser pipe comprises at least one reinforced pipe which is with a first end fitted into the through-opening of the caisson, and a string of main body pipes which is with a first end connected to a second end of the reinforced pipe, which string is configured to have a neutral buoyancy when submerged in water.

7. The floating production unit according to claim 6, wherein the string of main body pipes comprises a polymer material.

8. The floating production unit according to claim 1, wherein the floating production unit is a semi-submersible production unit.

9. The floating production unit according to claim 2, wherein a riser pipe is removably mounted into the through-opening of the sump tank with an upper end, the riser pipe having a free opposite lower end, which is provided with a strainer water-inlet, the riser pipe being adapted for transporting water from the water-inlet into the sump tank.

10. The floating production unit according to claim 2, wherein the riser pipe is at least 300 m long.

11. The floating production unit according to claim 3, wherein the riser pipe is at least 300 m long.

12. The floating production unit according to claim 2, wherein the sea water intake riser pipe is a substantially flexible riser pipe, being provided with a ballast at the lower end.

13. The floating production unit according to claim 3, wherein the sea water intake riser pipe is a substantially flexible riser pipe, being provided with a ballast at the lower end.

14. The floating production unit according to claim 4, wherein the sea water intake riser pipe is a substantially flexible riser pipe, being provided with a ballast at the lower end.

* * * * *